(12) United States Patent
Maronati et al.

(10) Patent No.: US 12,338,867 B2
(45) Date of Patent: Jun. 24, 2025

(54) DISK BRAKE DISK, DISK BRAKE AND MANUFACTURING METHOD

(71) Applicant: BREMBO S.p.A., Curno (IT)

(72) Inventors: Gianluigi Maronati, Curno (IT); Nino Ronchi, Curno (IT); Massimo Damiani, Curno (IT)

(73) Assignee: Brembo S.p.A., Curno (IT)

( * ) Notice: Subject to any disclaimer, the term of this patent is extended or adjusted under 35 U.S.C. 154(b) by 373 days.

(21) Appl. No.: 17/757,720

(22) PCT Filed: Dec. 15, 2020

(86) PCT No.: PCT/IB2020/061924
§ 371 (c)(1),
(2) Date: Jun. 20, 2022

(87) PCT Pub. No.: WO2021/130601
PCT Pub. Date: Jul. 1, 2021

(65) Prior Publication Data
US 2023/0035715 A1 Feb. 2, 2023

(30) Foreign Application Priority Data
Dec. 23, 2019 (IT) .......................... 102019000025222

(51) Int. Cl.
*F16D 65/12* (2006.01)
*F16D 65/00* (2006.01)
*F16D 65/02* (2006.01)

(52) U.S. Cl.
CPC .......... *F16D 65/123* (2013.01); *F16D 65/125* (2013.01); *F16D 65/128* (2013.01);
(Continued)

(58) Field of Classification Search
CPC ........... F16D 65/125; F16D 2200/0013; F16D 2250/0015
See application file for complete search history.

(56) References Cited

U.S. PATENT DOCUMENTS 5,107,966 A 4/1992 Metzler et al.
5,620,042 A * 4/1997 Ihm ....................... F16D 65/125
164/112

(Continued)

FOREIGN PATENT DOCUMENTS

CN 107917160 A * 4/2018 ............. B22D 18/02
DE 2033033 A1 1/1972
(Continued)

OTHER PUBLICATIONS

European Patent Office, International Search Report, issued in PCT/IB2020/061924, Feb. 5, 2021, Rijswijk, NL.

*Primary Examiner* — Melody M Burch
(74) *Attorney, Agent, or Firm* — Marshall & Melhorn, LLC (57) ABSTRACT

A disk brake disk has a bell made of a first material and a braking band made of a second material. The bell has a bell body having a radially outer bell body portion and forms a plurality of bell projections radially protruding from the radially outer bell body portion. Each bell projection has a projection base close to the radially outer bell body portion and a distal projection portion far from the radially outer bell body portion. A braking band body is coupled to the distal projection portion. Adjacent projection bases are joined to one another by a bell rib made in a single piece with the bell body and having an inner axial rib face and an outer axial rib face. The braking band body is coupled to the inner axial rib face, leaving the outer axial rib face free and externally facing the disk brake disk.

12 Claims, 6 Drawing Sheets

(52) U.S. Cl.
CPC ............ *F16D 2065/1308* (2013.01); *F16D 2065/1328* (2013.01); *F16D 2065/1344* (2013.01); *F16D 2200/0013* (2013.01); *F16D 2250/0015* (2013.01)

(56) References Cited

U.S. PATENT DOCUMENTS

| | | | |
|---|---|---|---|
| 5,862,892 A * | 1/1999 | Conley | F16D 65/123 188/218 XL |
| 6,152,270 A | 11/2000 | Giorgetti | |
| 6,564,912 B1 | 5/2003 | Koschinat | |
| 7,861,832 B2 | 1/2011 | Kleber | |
| 2006/0213732 A1 | 9/2006 | Leevy et al. | |
| 2007/0119667 A1 | 5/2007 | Hanna et al. | |
| 2007/0246314 A1 | 10/2007 | Schorn et al. | |
| 2008/0041674 A1 | 2/2008 | Walker et al. | |
| 2010/0065388 A1 | 3/2010 | Kleber | |
| 2011/0290602 A1 | 12/2011 | Kleber et al. | |
| 2013/0037359 A1 | 2/2013 | Kim et al. | |

FOREIGN PATENT DOCUMENTS

| | | | | |
|---|---|---|---|---|
| DE | 8026664 U1 | | 1/1981 | |
| DE | 3823146 A1 | | 1/1990 | |
| DE | 19918667 A1 | | 10/2000 | |
| DE | 102007061954 A1 | * | 7/2009 | ........... F16D 65/123 |
| DE | 102008047190 A | * | 4/2010 | |
| EP | 1092889 A1 | | 4/2001 | |
| EP | 1128084 A2 | | 8/2001 | |
| EP | 1426644 A2 | | 6/2004 | |
| EP | 2522875 A1 | | 11/2012 | |
| EP | 3147529 A1 | | 3/2017 | |
| ES | 8202409 A1 | | 10/1981 | |
| GB | 1543497 A | | 4/1979 | |
| GB | 2107012 A | | 4/1983 | |
| WO | 2006046258 A1 | | 5/2006 | |
| WO | 2009137101 A2 | | 11/2009 | |

* cited by examiner

DISK BRAKE DISK, DISK BRAKE AND MANUFACTURING METHOD

CROSS-REFERENCE TO RELATED APPLICATIONS

This application is a National Phase Application of PCT International Application No. PCT/IB2020/061924, having an International Filing Date of Dec. 15, 2020 which claims priority to Italian Application No. 102019000025222 filed Dec. 23, 2019, each of which is hereby incorporated by reference in its entirety.

FIELD OF THE INVENTION

The present invention relates to a disk brake disk, to a disk brake, and to a method for manufacturing said disk.

In particular, the present invention relates to a disk brake disk made in a single piece and obtained by co-casting two materials.

The disk brake disk is described below referring to the rotation axis of the disk, indicated by the reference symbol X-X, which defines an axial direction. Axial direction means any direction A-A directed parallel to the rotation axis of the brake disk. In addition, radial direction R-R means all directions orthogonal to rotation axis X-X and incident therewith. Still further, circumferential direction C-C means the circumference orthogonal to the axial direction coinciding with the rotation axis X-X and to the radial directions R-R.

Conversely, tangential direction T-T means a direction which is punctually orthogonal to an axial direction A-A and a radial direction R-R in the point of intersection thereof.

BACKGROUND

As known, disk brake disks consist of two parts which share a rotation axis. A first part, the support bell, is intended to be connected to a wheel hub of a vehicle, while the remaining outer part, the braking band, is intended to cooperate with a disk brake caliper which, arranged straddling said braking band, exerts a braking action on the vehicle. The braking band can be of the full type or, as in the examples depicted in the accompanying figures, of the ventilated type. The ventilated band comprises two folders connected to each other by means of a plurality of bridges or connection elements, so as to define circulation channels for the cooling air.

In vehicles, and in particular in industrial vehicles, it is particularly important to maximize the braking action and allow a safe control for the driver of the vehicle in order to have a powerful braking action despite the huge braking torques involved.

In addition, the need is particularly felt to make the braking band of a material which, in addition to ensuring the desired friction features, is capable of keeping the mechanical features thereof unaltered as much as possible upon increasing the operating temperature. In view of this, it is particularly convenient to make the braking band, for example, of lamellar cast iron or gray cast iron.

Likewise, the need is particularly felt to make the support bell of a material which is as ductile as possible, firstly in order to reduce the probability of high stresses creating cracks or breakages especially in the junction areas between the braking band and the bell. In view of this, it is known to make the support bell of a light alloy, e.g., an aluminum alloy, which solution is however unsuitable for the huge stresses present in a braking action of an industrial vehicle.

From the above, the dual need to allow the transmission of the braking torque from the braking band to the support bell, while simultaneously allowing the braking band to support high thermal stresses, is apparent.

Patent EP 1092889, to the same applicant, describes a disk in which the aluminum alloy bell and the cast iron braking band are joined to each other by means of a plurality of stainless steel pins. These pins, coupled by interference in the braking bands and with clearance in the bell, ensure that the band is able to radially dilate.

This solution is particularly advantageous from many points of view but is particularly cumbersome and complicated from a constructional point of view. Furthermore, the reduced section of the steel pins causes apparent stress peaks in the material during the step of transmitting the braking torque from the band to the bell.

A disk having a braking band made of cast iron and a support bell made of a light alloy is also known from patent U.S. Pat. No. 6,152,270, to the same applicant. The two pieces produced for successive casting operations are produced so as to adhere in order to be coupled to each other. Despite being cheap and easy to implement, this solution does not ensure a constant coupling between the braking band and the bell even under conditions of strong thermal excursions and is obviously unsuitable for industrial applications.

It is known from document EP 1426644 to manufacture a disk brake disk having a braking band made of a first material and a bell made of a second material. This document shows different solutions which allow the bell to be coupled to the braking band by plastic deformation of the material of the bell on a coupling portion of the band, or alternatively which allow the bell to be cast about band projections.

Despite being satisfactory from many points of view, this known solution does not allow to obtain a coupling between the band and bell which ensures the transmission of the torque from the band to the hub during high and repeated thermal excursions, both due to the geometry of the suggested geometric coupling between the band and the bell and due to the conical deformation of the bell, which deteriorates the geometric coupling between the bell and the band even more.

It is known from document DE 3823146 to manufacture a braking disk in two parts, a braking band and a bell, which are connected to each other by means of a geometric coupling portion welded by brazing. Despite being satisfactory from many points of view, this solution does not exhibit a geometry of the geometric coupling between the braking band and the bell which ensures a safe transfer of the torque from the band to the hub even under difficult braking conditions and during high and repeated thermal excursions. Furthermore, in this solution, contrivances are not suggested to reduce the conical deformation of the bell, which further accentuate the limits of the suggested geometric coupling.

Document ES 8202409, to the same applicant, suggests a disk brake disk solution consisting of two components, a braking band and a bell, where the bell is cast following the creation of the braking band on a leg of the braking band which protrudes axially, thus obtaining an undercut portion both in a circumferential direction and in an axial direction. Despite being satisfactory from many points of view, this solution does not exhibit a geometry of the geometric coupling between the braking band and bell cast thereon which ensures a constant and durable transmission of the torque, even in case of difficult and repeated braking operations.

SUMMARY

Document US 2007119667 also shows a disk obtained by subsequently casting a bell on a braking band previously manufactured, as does document U.S. Pat. No. 6,152,270 to the same applicant. In these solutions, the bell has an end to be coupled to the band radially folded so as to accommodate a radial toothing of the braking band.

Solution GB 2107012 also shows a similar solution where the braking band is embedded with a radial toothing thereof inside the bell body.

A similar solution to those described above is given in document U.S. Pat. No. 7,861,832. Other solutions are described in documents WO 2006/046258, GB2107012, EP1426644, U.S. Pat. No. 5,107,966 EP2522875, GB1543497, DE2033033, DE19918667, U.S. Pat. No. 6,564,912, US2006213732A1, US20100065388, US20070119667, WO2009137101A2, US2007246314A1 to the same applicant, US2011290602, US2008041674, US2013037359, DE8026664U1 and EP 1128084.

Despite being satisfactory from many points of view, all these solutions do not allow a good cohesion between the material of the bell and the material of the band, which cohesion remains unaltered during the repeated and difficult braking actions, which are typical, for example, of a vehicle of the industrial type, for example, or of a commercial vehicle, limiting the ability to transfer the braking torque from the band to the hub and sometimes resulting in small clearances in the coupling between the braking band and the bell.

For this reason, the needs are strongly felt to ensure an adequate transmission of the braking action from the braking band to the bell, while simultaneously ensuring a uniform axial support on all 360° in the zones in which the pulling teeth are absent.

This need adds to the need to limit the axial movements between the two components, the braking band and bell, during the operation of the disk.

In addition, the need is felt to ensure the positioning of the parts during the casting operation, thus preventing the cast iron of the braking band from leaking close to the area of contact with the bell.

It is a further object of the present invention to provide a disk brake disk obtained by co-casting for vehicles, such as commercial and industrial vehicles, that is a disk capable of withstanding a braking torque applied to the braking band which is even higher than 30,000 Nm and applicable both to front and rear axles and for different rim sizes.

These and other objects are achieved by a brake disk, a brake and a method for manufacturing a disk as described and claimed herein.

Some advantageous embodiments are the subject of the dependent claims.

From an analysis of this solution, it emerged how the suggested solution allows a reduction in weight as compared a disk made in a single piece or a floating disk from the prior art (even up to −13%).

In addition, by virtue of the solutions suggested and listed in the appended claims, it is possible:

- to improve the axial deflection or axial displacement as compared to the disks of the known art (up to −50%);
- to reduce the operating temperature as compared to floating disks;
- to avoid fixing components;
- to obtain an easier set up for the current arrangement of the end of the wheel due to a lighter weight;
- to have a quicker and cheaper maintenance.

DESCRIPTION OF THE FIGURES

Further features and advantages of the invention will become apparent from the following description of preferred embodiments thereof, given by way of non-limiting example, with reference to the accompanying drawings, in which.

DETAILED DESCRIPTION

According to a general embodiment, a disk brake disk or disk is indicated by reference numeral 1 in the accompanying figures.

Said disk 1 is made in a single piece and obtained by co-casting two materials.

Said disk 1 comprises a bell 2 made of a first material and adapted to connect said disk 1 to a rotating support.

Said disk 1 further comprises a braking band 3 made of a second material.

Said disk 1 defines an axial direction A-A coincident with, or parallel to, the rotation axis X-X thereof, a radial direction R-R, orthogonal to said rotation axis X-X and defining a radially outer direction RE when moving away from said rotation axis X-X, as well as a radially inner direction RI when moving close to said rotation axis X-X, a circumferential direction C-C orthogonal to said axial direction A-A and to said radial direction R-R, as well as a tangential direction T-T orthogonal to said axial direction A-A and to said radial direction R-R in a point of intersection of said axial direction A-A and to said radial direction R-R.

Said bell 2 comprises a bell body 4 having a radially outer bell body portion 5.

Said bell 2 forms a plurality of bell projections or projections 6 in a single piece, which radially protrude from said radially outer bell body portion 5 according to said radially outer direction RE.

Each projection 6 comprises a projection base or base 7, arranged close to said radially outer bell body portion 5, and a distal projection portion or distal portion 8, arranged far from said radially outer bell body portion 5.

Said braking band 3 has a braking band body 12. Said braking band body 12 is connected and intimately coupled to said distal portion 8 wrapping said distal portion 8 all around and at the top.

Advantageously, the adjacent bases 7 of said plurality of projections 6 are joined to one another by a bell rib or rib 13 made in a single piece with said bell body 4.

Each rib 13 comprises an inner axial rib face or inner face 14 and an opposite outer axial rib face or outer face 15.

Said braking band body 12 is connected and intimately coupled to said inner face 14, leaving said outer face 15 free and thus externally facing said disk 1.

According to an embodiment, the group of said ribs 13 forms a single annular rib 17.

According to an embodiment, each of said ribs 13 has an extension height, in the radial direction R-R, similar to the height, in the radial direction R-R, of said radially outer bell body portion 5 to which they are connected.

According to an embodiment, said radially outer bell body portion 5 is cylindrical in shape.

According to an embodiment, said disk is obtained by casting said braking band 3 onto said bell 2.

According to an embodiment, said disk is obtained by casting said braking band 3 onto said radially outer bell body portion 5 and said bell projections 6.

According to an embodiment, said bell 2 is made of spheroidal cast iron or ductile cast iron.

According to an embodiment, said braking band 3 is made of lamellar cast iron or gray cast iron.

According to an embodiment, said distal portion 8 comprises an outer axial face 9 and an opposite axial face or inner axial face 10, as well as a circumferential projection edge or projection edge 11.

According to an embodiment, said braking band body 12 is connected and intimately coupled to said outer axial face 9, said inner axial face 10 and said projection edge 11.

According to an embodiment, each rib 13 comprises a rib edge 16 which joins said inner face 14 to said outer face 15.

According to an embodiment, said braking band body 12 is connected and intimately coupled to said rib edge 16.

According to an embodiment, all the outer axial faces 9 of all the bell projections or projections 6 lie on one plane comprising the same radial direction R-R and the same circumferential direction C-C.

According to an embodiment, all the opposite axial faces or inner axial faces 10 of all the bell projections or projections 6 lie, at least for the part thereof which is closest to the projection bases 7, in a conical surface having axis coinciding with the rotation axis X-X of the disk.

According to an embodiment, all the projections 6 are evenly distributed in a circumferential direction C-C.

According to an embodiment, in a plane Pr-c containing a radial R-R and a circumferential C-C direction, which are mutually incident, each of said projection bases 7 is joined to the bell body 4 in a circumferential direction C-C by means of fillet radii 18.

According to an embodiment, in a plane Pr-c containing a radial R-R and a circumferential C-C direction, which are mutually incident, each of said distal projection portions 8 has a rounded profile.

According to an embodiment, in a plane Pr-c containing a radial R-R and a circumferential C-C direction, which are mutually incident, each of said distal projection portions 8 has rounded edges and a radially outer flat base.

According to an embodiment, in a plane Pr-c containing a radial R-R and a circumferential C-C direction, which are mutually incident, each of said projection bases 7 has a quadrangular shape in height in a radial direction R-R, which is equal to said bell rib or rib 13.

According to an embodiment, in a plane Pr-a containing a radial R-R and an axial A-A direction, which are mutually incident, each of said projections tapers from said projection base 7 to the end of said distal projection portion 8.

According to an embodiment, said braking band 3 is of the ventilated type comprising an inner folder 19 and an outer folder 19, 20 connected by means of connection elements 21 which are separate from one another to form a ventilation space 22.

According to an embodiment, said outer folder 19 comprises an inner enlarged folder portion 23 which is enlarged in an axial direction A-A to incorporate said distal projection portions 8 therein.

The present invention further relates to a disk brake comprising a disk brake disk or disk 1 according to any one of the previously described embodiments.

Figure 1:
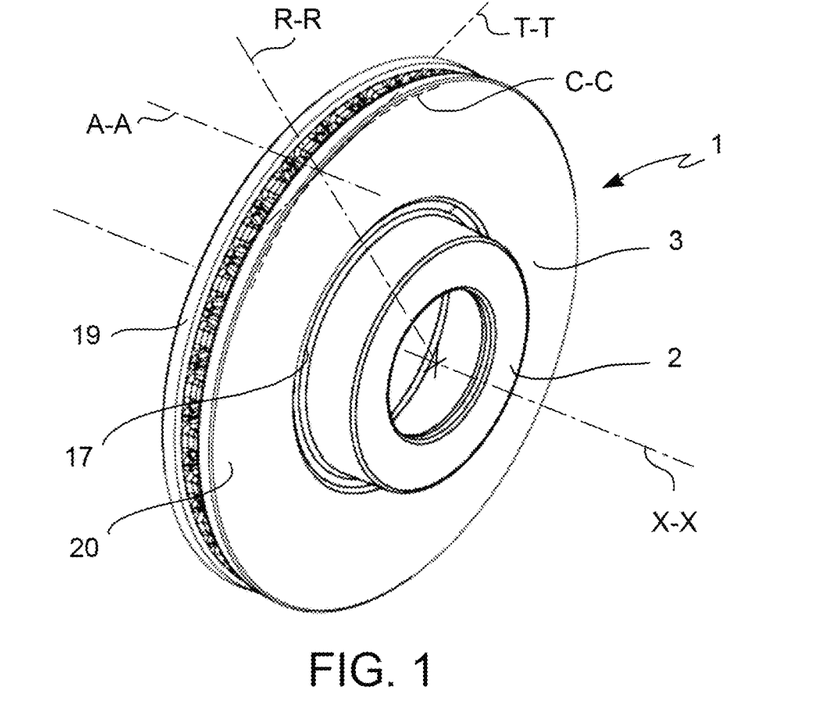
FIG. 1 is an axonometric view of a rough disk brake disk.
Figure 2:
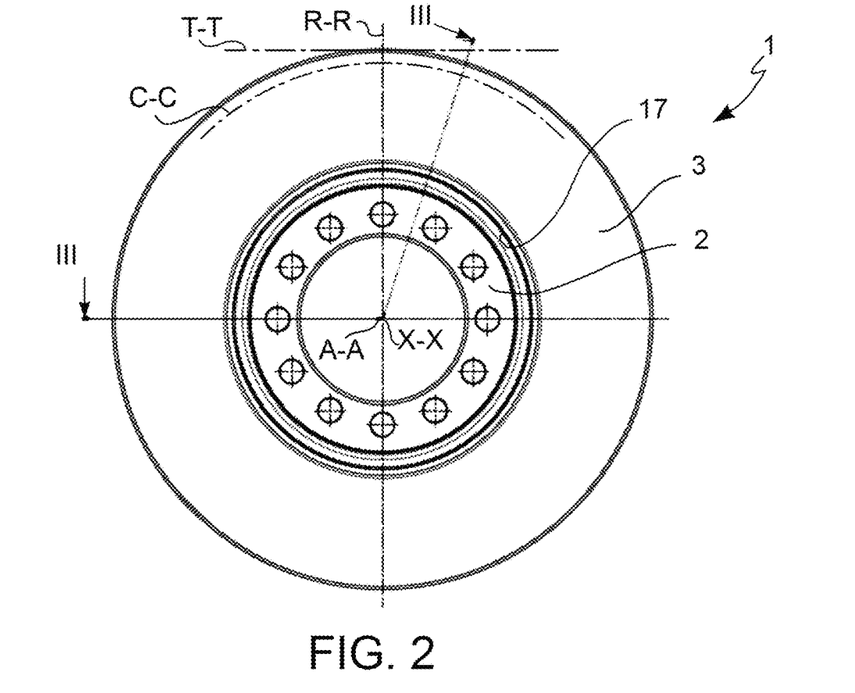
FIG. 2 shows a front view of the disk in FIG. 1 after the finishing.
Figure 3:
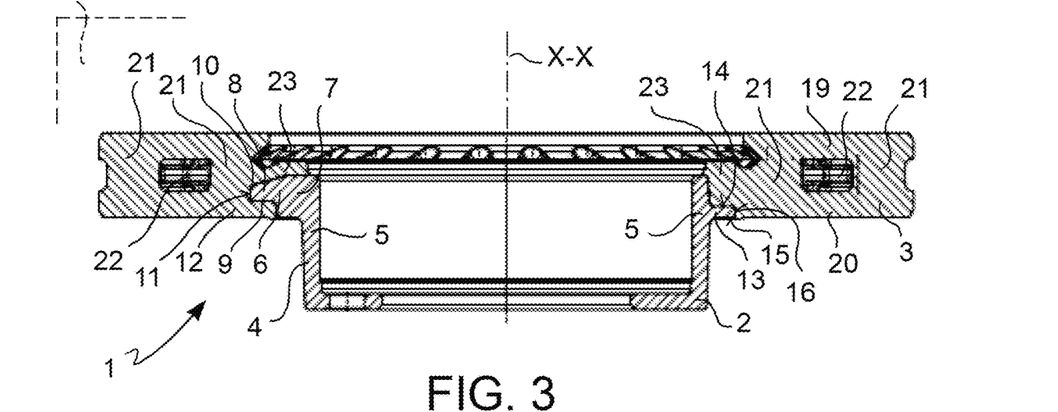
FIG. 3 is a section according to line III-III in FIG. 2.
Figure 4:
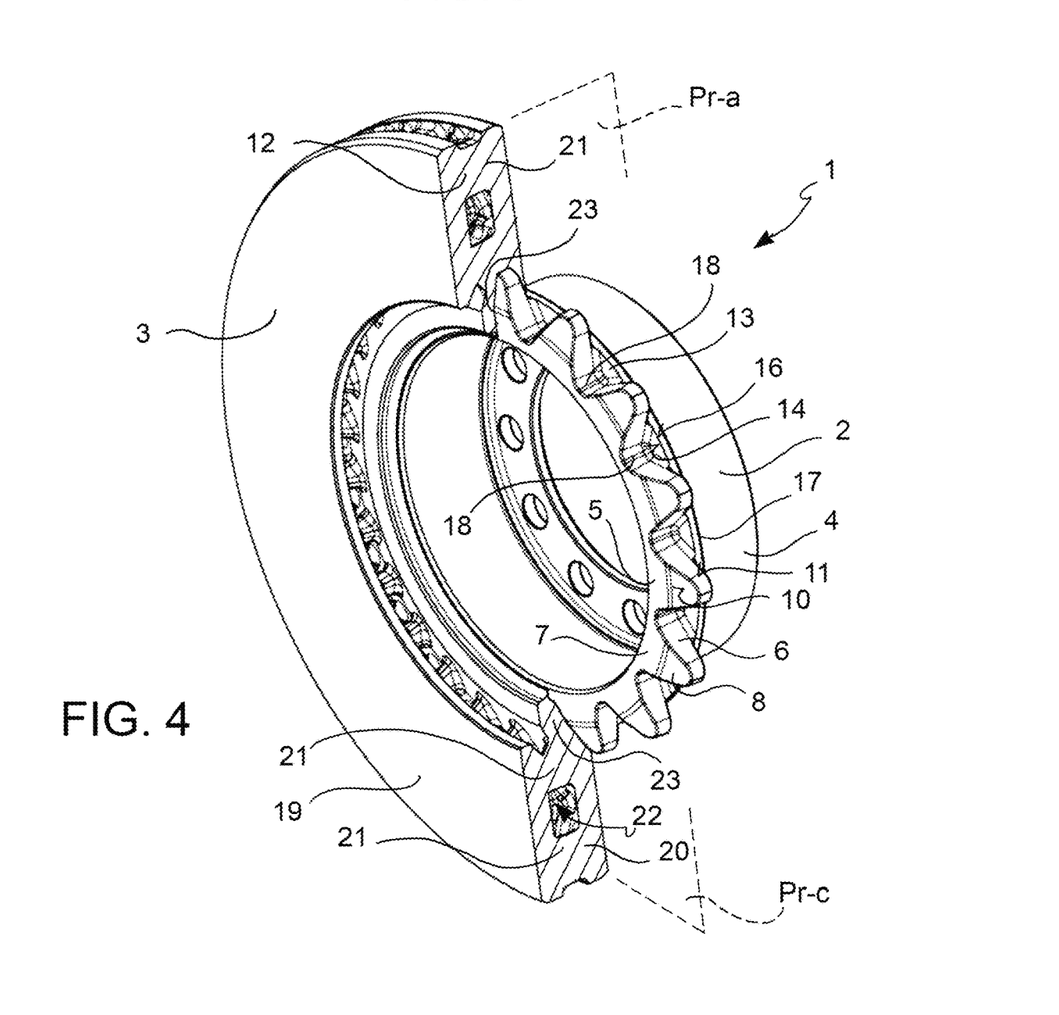
FIG. 4 shows an axonometric view, partially sectioned only in the braking band, of the disk in FIG. 1 from the inner side or vehicle-facing side thereof.
Figure 5:
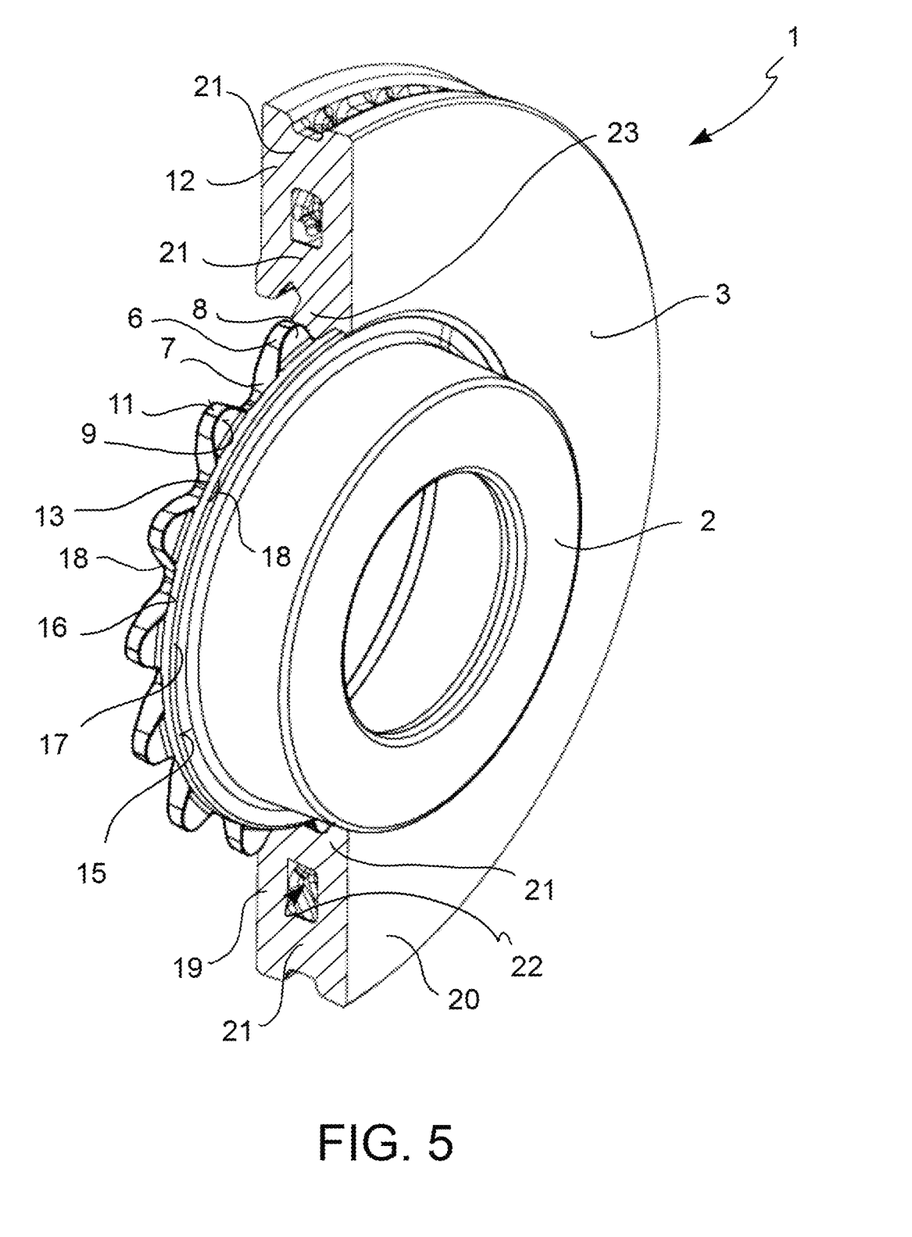
FIG. 5 shows an axonometric view, partially sectioned only in the braking band, of the disk in FIG. 4, although in a rough state, from the outer side or vehicle wheel-facing side thereof.
Figure 6:
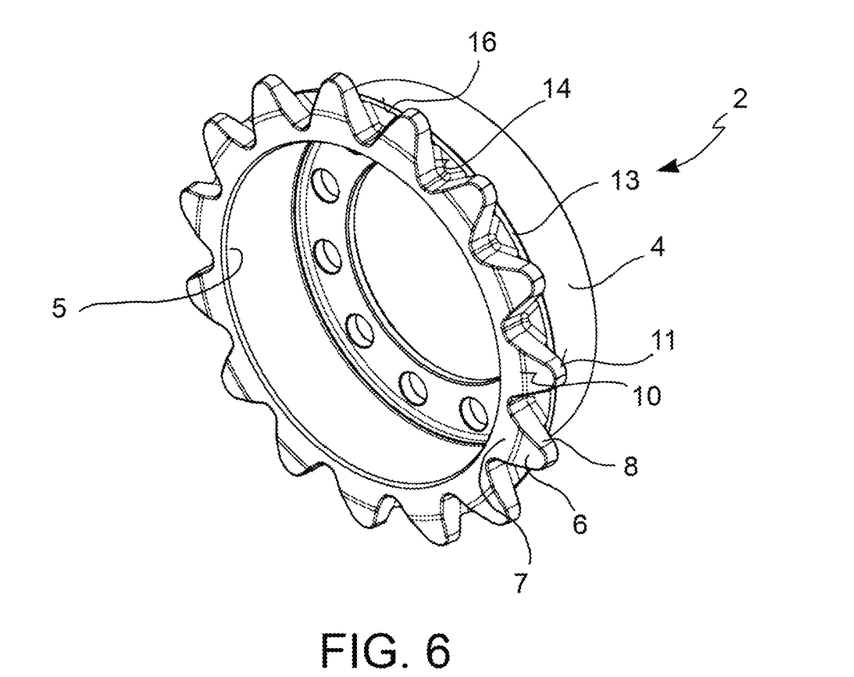
FIG. 6 shows an axonometric view of a bell of the disk in FIG. 1 from the inner side or vehicle-facing side.
Figure 7:
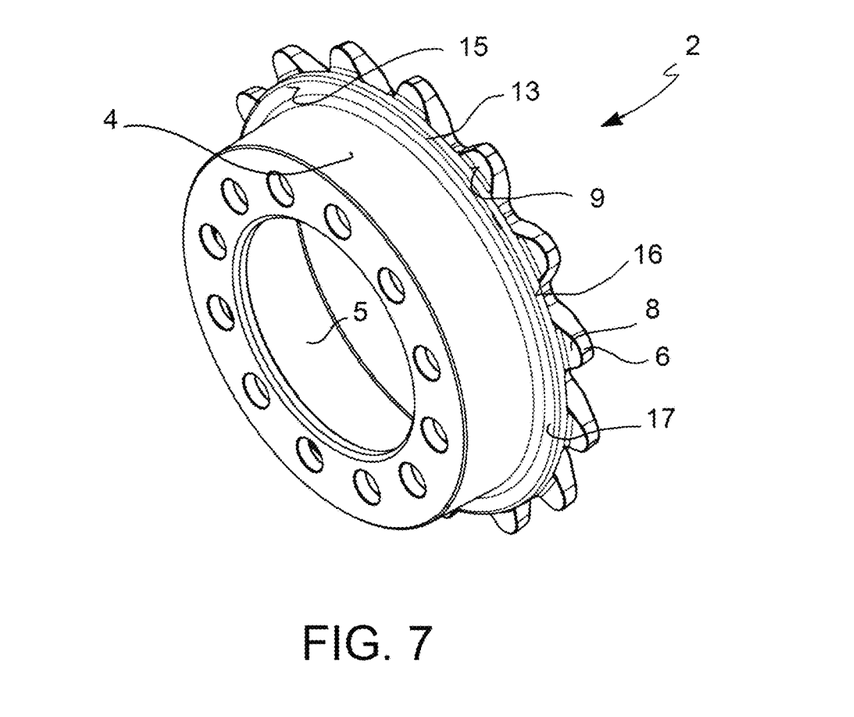
FIG. 7 is an axonometric view of the bell in FIG. 6 from the outer side or the vehicle wheel-facing side thereof.
Figure 8:
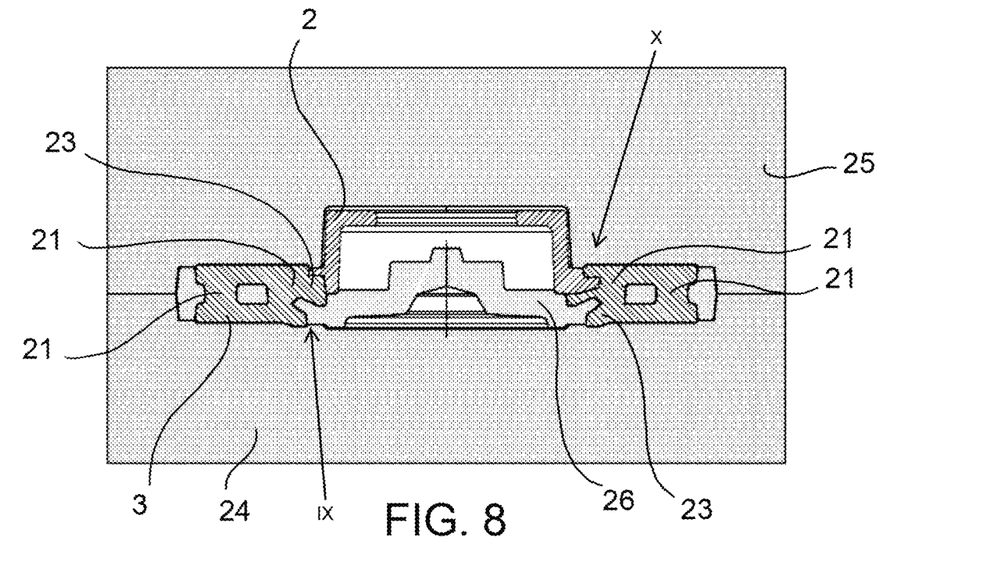
FIG. 8 is a section of a second die in which a braking band has been cast onto a bell and a foundry core.
Figure 9:
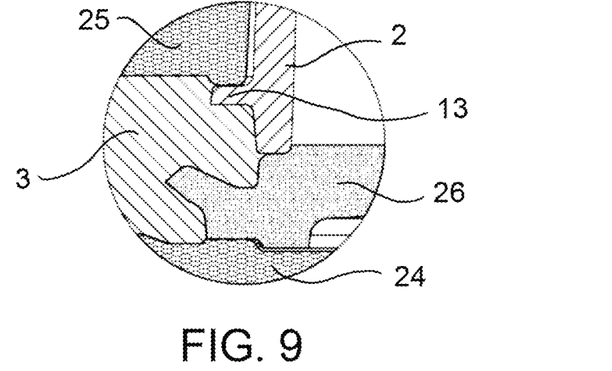
FIG. 9 shows a section of the detail IX in FIG. 8.
Figure 10:
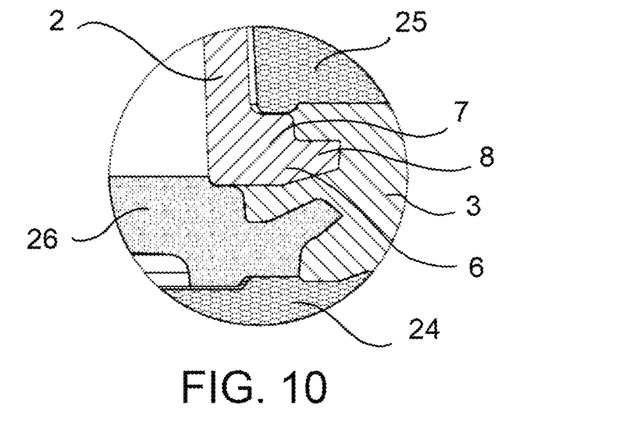
FIG. 10 shows a section of the detail X in FIG. 8.
Figure 11:
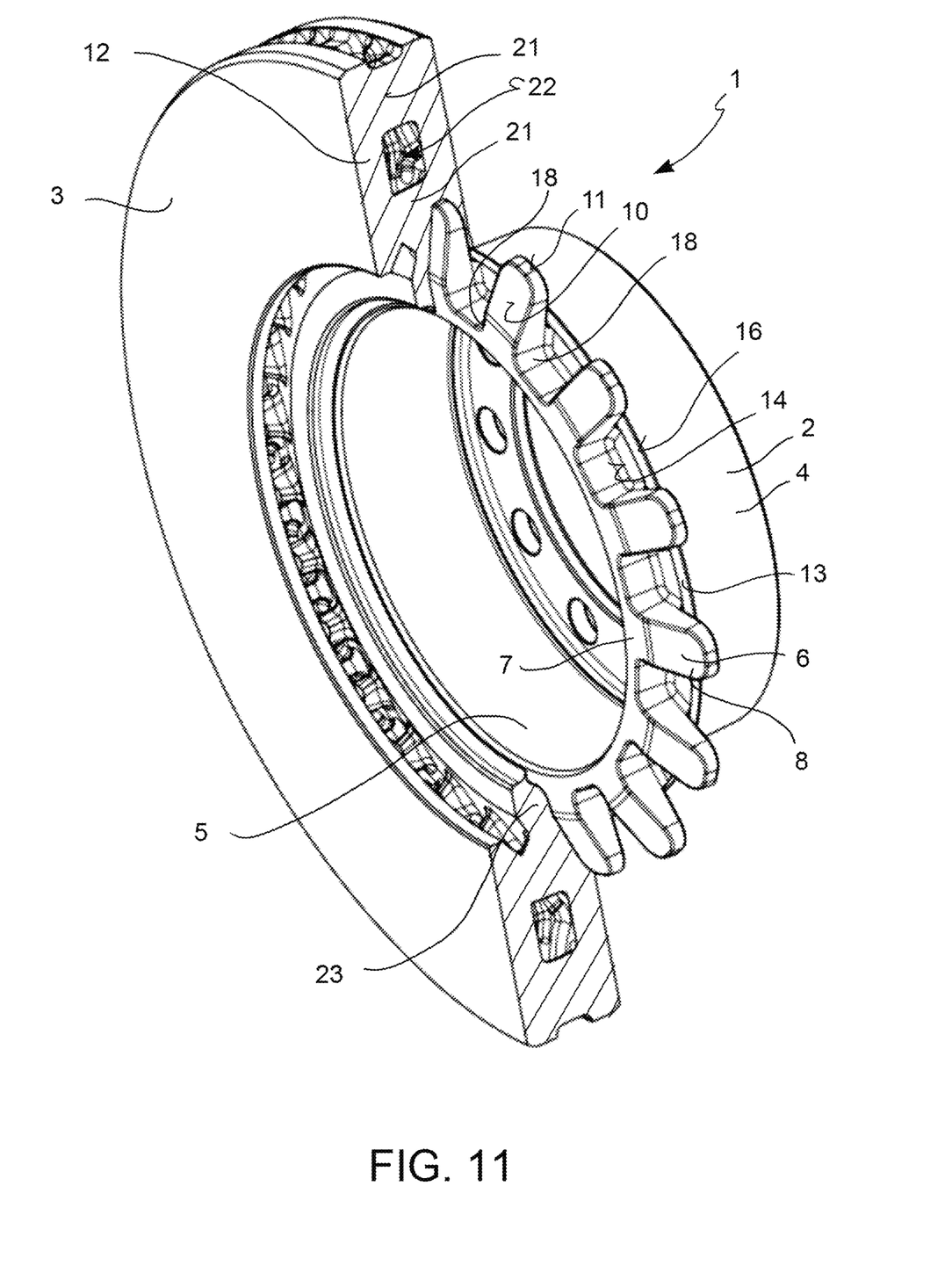
FIG. 11 is an axonometric view, partially sectioned only in the braking band, of a disk brake disk according to a different embodiment.

The present invention further relates to a method for manufacturing a disk brake disk or disk 1 according to any one of the previously described embodiments, where there are included the steps of:

casting a first material into a first die to obtain a bell 2, obtaining, in a radially outer bell body portion 5, a plurality of bell projections or projections 6, in one piece, which radially protrude from said radially outer bell body portion 5 according to said radially outer direction RE, forming a projection base or base 7 in each projection 6, arranged close to said radially outer bell body portion 5, and a distal projection portion or distal portion 8, arranged far from said radially outer bell body portion 5;

inserting said bell 2 into a second die 24, 25;

casting a second material into said second die to obtain a braking band 3 co-cast in a single piece with said bell 2, incorporating the distal projection portion 8 of said projections 6, wrapping said distal portion 8 all around and at the top;

and in addition, with the step of obtaining said bell 2, bell ribs or ribs 13 are made in a single piece with said bell body 4, connected to said adjacent bases 7 of said plurality of projections 6, obtaining an inner axial rib face or inner face 14 and an opposite outer axial rib face or outer face 15 for each rib 13;

and in addition, with the step of obtaining said braking band 3, said braking band 12 is connected and intimately coupled to said inner face 14, leaving said outer face 15 free from the second material of said braking band 3.

According to an embodiment, there is included the step of further inserting a foundry core 26 into said second die 24, 25, adapted to obtain said braking band 3 as a braking band of the ventilated type.

In order to meet contingent and specific needs, those skilled in the art can make several changes and adaptations to the embodiments described above and replace elements with others which are functionally equivalent, without departing from the scope of the following claims.

LIST OF REFERENCE SYMBOLS 1 disk brake disk
2 bell
3 braking band
4. bell body
5 radially outer bell body portion
6 bell projection 7 projection base
8 distal projection portion
9 outer axial face
10 opposite axial face or inner axial face
11 circumferential projection edge or projection edge
12 braking band body
13 bell rib or rib
14 inner axial rib face or inner face
15 outer axial rib face or outer face
16 rib edge
17 single annular rib
18 bell body-base connection fillet radii
19 band folder
20 band folder
21 band connection elements
22 ventilation space
23 inner enlarged folder portion
24 first half-die of second die
25 second half-die of second die
26 foundry core
A-A axial direction
X-X a rotation axis or disk rotation axis
R-R radial direction
C-C circumferential direction
T-T tangential direction
Pr-c plane containing a radial direction and a circumferential direction which are mutually incident
Pr-a plane containing a radial direction and an axial direction which are mutually incident

The invention claimed is:

1. A disk brake disk, made in a single piece by co-casting two materials, comprising:
a bell made of a first material and configured to connect said disk brake disk to a rotating support;
a braking band made of a second material;
said disk brake disk defining an axial direction (A-A) coinciding with, or parallel to, a rotation axis (X-X), a radial direction (R-R) orthogonal to said rotation axis (X-X) and defining a radially outer direction when moving away from said rotation axis (X-X), and a radially inner direction when moving close to said rotation axis (X-X), a circumferential direction (C-C) orthogonal to said axial direction (A-A) and to said radial direction (R-R), and a tangential direction (T-T) orthogonal to said axial direction (A-A) and to said radial direction (R-R) in a point of intersection of said axial direction (A-A) and to said radial direction (R-R); wherein
said bell comprises a bell body having a radially outer bell body portion;
said bell forms a plurality of bell projections in a single piece, which radially protrude from said radially outer bell body portion according to said radially outer direction;
each bell projection comprises a projection base, arranged close to said radially outer bell body portion, and a distal projection portion, arranged far from said radially outer bell body portion; wherein
said braking band comprises a braking band body;
said braking band body is connected and intimately coupled to said distal projection portion, wrapping said distal projection portion all around and at the top; and wherein
adjacent projection bases of said plurality of bell projections are joined to one another by a bell rib made in a single piece with said bell body;

the bell rib comprises an inner axial rib face and an opposite outer axial rib face; and
said braking band body is connected and intimately coupled to said inner axial rib face, leaving said outer axial rib face free and externally facing said disk brake disk.

2. The disk brake disk of claim 1, wherein
a group of bell ribs forms a single annular rib, and wherein at least one of the following features applies:
each of said bell ribs has an extension height, in the radial direction (R-R), similar to a height, in the radial direction (R-R), of said radially outer bell body portion to which the bell ribs are connected;
said radially outer bell body portion is cylindrical in shape.

3. The disk brake disk of claim 1, wherein
said disk brake disk is obtained by casting said braking band onto said bell; or
said disk brake disk is obtained by casting said braking band onto said radially outer bell body portion and said bell projections, and wherein at least one of the following features applies:
said bell is made of spheroidal cast iron or ductile cast iron;
said braking band is made of lamellar cast iron or gray cast iron.

4. The disk brake disk of claim 1, wherein
said distal projection portion comprises an outer axial face, an inner axial face, and a circumferential projection edge;
said braking band body is connected and intimately coupled to said outer axial face, said inner axial face and said circumferential projection edge, and wherein at least one of the following features applies:
each bell rib comprises a rib edge that joins said inner axial rib face to said outer axial rib face;
said braking band body is connected and intimately coupled to said rib edge.

5. The disk brake disk of to claim 4, wherein
all outer axial faces of all the bell projections lie on one plane comprising a same radial direction (R-R) and a same circumferential direction (C-C); and/or wherein all inner axial faces of all the bell projections lie, at least for a part thereof that is closest to the projection bases, in a conical surface having an axis coinciding with the rotation axis (X-X) of the disk brake disk.

6. The disk brake disk of claim 1, wherein
all the bell projections are evenly distributed in the circumferential direction (C-C), and wherein at least one of the following features applies:
in a plane containing the radial direction (R-R) and the circumferential (C-C) direction, which are mutually incident, each of said projection bases is joined to the bell body in the circumferential direction (C-C) by fillet radii;
in a plane containing the radial direction (R-R) and the circumferential (C-C) direction, which are mutually incident, each distal projection portion has a rounded profile;
in a plane containing the radial direction (R-R) and the circumferential (C-C) direction, which are mutually incident, each distal projection portion has rounded edges and a radially outer flat base;
in a plane containing the radial direction (R-R) and the circumferential (C-C) direction, which are mutually incident, each of said projection bases has a quadrangular shape in height in the radial direction (R-R) which is equal to said bell rib;

in a plane containing the radial direction (R-R) and the axial (A-A) direction, which are mutually incident, each of said bell projections tapers from said projection base to an end of said distal projection portion.

7. The disk brake disk of claim 1, wherein
said braking band is ventilated and comprises an inner folder and an outer folder connected by connection elements that are separate from one another to form a ventilation space;
said outer folder comprises an inner enlarged folder portion which is enlarged in the axial direction (A-A) to incorporate distal projection portions.

8. A disk brake comprising the disk brake disk of claim 1.

9. A method for manufacturing a disk brake disk made in a single piece by co-casting two materials, comprising:
a bell made of a first material and configured to connect said disk brake disk to a rotating support;
a braking band made of a second material;
said disk brake disk defining an axial direction (A-A) coinciding with, or parallel to, a rotation axis (X-X), a radial direction (R-R) orthogonal to said rotation axis (X-X) and defining a radially outer direction when moving away from said rotation axis (X-X), and a radially inner direction when moving close to said rotation axis (X-X), a circumferential direction (C-C) orthogonal to said axial direction (A-A) and to said radial direction (R-R), and a tangential direction (T-T) orthogonal to said axial direction (A-A) and to said radial direction (R-R) in a point of intersection of said axial direction (A-A) and to said radial direction (R-R); wherein
said bell comprises a bell body having a radially outer bell body portion;
said bell forms a plurality of bell projections in a single piece, which radially protrude from said radially outer bell body portion according to said radially outer direction;
each bell projection comprises a projection base, arranged close to said radially outer bell body portion, and a distal projection portion, arranged far from said radially outer bell body portion;
wherein
said braking band comprises a braking band body;
said braking band body is connected and intimately coupled to said distal projection portion, wrapping said distal projection portion all around and at the top; and wherein
adjacent projection bases of said plurality of bell projections are joined to one another by a bell rib made in a single piece with said bell body;
the bell rib comprises an inner axial rib face and an opposite outer axial rib face; and
said braking band body is connected and intimately coupled to said inner axial rib face, leaving said outer axial rib face free and externally facing said disk brake disk,
the method comprising:
casting a first material into a first die to obtain a bell, obtaining, in a radially outer bell body portion, a plurality of bell projections, in one piece, which radially protrude from said radially outer bell body portion according to said radially outer direction, forming a projection base in each bell projection, arranged close to said radially outer bell body portion, and a distal projection portion, arranged far from said radially outer bell body portion;
inserting said bell into a second die;
casting a second material into said second die to obtain a braking band co-cast in a single piece with said bell, incorporating the distal projection portion of said bell projections, wrapping said distal projection portion all around and at the top;
wherein
with the step of obtaining said bell, bell ribs are made in a single piece with said bell body, connected to said adjacent projection bases of said plurality of bell projections, obtaining an inner axial rib face and an outer axial rib face for each bell rib; and
with the step of obtaining said braking band, said braking band body is connected and intimately coupled to said inner axial rib face, leaving said outer axial rib face free from the second material of said braking band.

10. The method of claim 9, wherein a foundry core configured to obtain said braking band as a ventilated braking band is inserted into said second die.

11. The disk brake disk of claim 1, wherein the inner axial rib face and the opposite outer axial rib face are radially aligned.

12. A disk brake disk, made in a single piece by co-casting two materials, comprising:
a bell made of a first material and configured to connect said disk brake disk to a rotating support;
a braking band made of a second material;
said disk brake disk defining an axial direction (A-A) coinciding with, or parallel to, a rotation axis (X-X), a radial direction (R-R) orthogonal to said rotation axis (X-X) and defining a radially outer direction when moving away from said rotation axis (X-X), and a radially inner direction when moving close to said rotation axis (X-X), a circumferential direction (C-C) orthogonal to said axial direction (A-A) and to said radial direction (R-R), and a tangential direction (T-T) orthogonal to said axial direction (A-A) and to said radial direction (R-R) in a point of intersection of said axial direction (A-A) and to said radial direction (R-R); wherein
said bell comprises a bell body having a radially outer bell body portion;
said bell forms a plurality of bell projections in a single piece, which radially protrude from said radially outer bell body portion according to said radially outer direction;
each bell projection comprises a projection base, arranged close to said radially outer bell body portion, and a distal projection portion, arranged far from said radially outer bell body portion;
wherein
said braking band comprises a braking band body;
said braking band body is connected and intimately coupled to said distal projection portion, wrapping said distal projection portion all around and at the top; and wherein
adjacent projection bases of said plurality of bell projections are joined to one another by a bell rib made in a single piece with said bell body;
the bell rib comprises an inner axial rib face and an opposite outer axial rib face; and said braking band body is connected and intimately coupled to said inner axial rib face, leaving said outer axial rib face free and externally facing said disk brake disk,
wherein
said braking band is ventilated and comprises an inner folder and an outer folder connected by connection elements that are separate from one another to form a ventilation space;
said outer folder comprises an inner enlarged folder portion which is enlarged in the axial direction (A-A) to incorporate distal projection portions.

* * * * *